United States Patent
Sorensen et al.

(10) Patent No.: US 8,038,968 B2
(45) Date of Patent: Oct. 18, 2011

(54) RADIATIVE HEAT TRANSFER VIA SHUNT IN A STEAM REFORMING REACTOR

(75) Inventors: Bob Sorensen, Hillsboro, OR (US);
Craig E. Evans, Portland, OR (US);
Brian Sonnichsen, Portland, OR (US)

(73) Assignee: ClearEdge Power, Inc., Hillsboro, OR (US)

( * ) Notice: Subject to any disclaimer, the term of this patent is extended or adjusted under 35 U.S.C. 154(b) by 0 days.

(21) Appl. No.: 12/914,793

(22) Filed: Oct. 28, 2010

(65) Prior Publication Data
US 2011/0206570 A1    Aug. 25, 2011

(51) Int. Cl.
*B01J 8/00* (2006.01)
*B01J 8/02* (2006.01)
*F28D 21/00* (2006.01)

(52) U.S. Cl. ......... 422/629; 422/202; 422/211; 422/625

(58) Field of Classification Search .......... 422/202, 422/211, 625, 629
See application file for complete search history.

(56) References Cited

U.S. PATENT DOCUMENTS

| 4,861,348 | A | * | 8/1989 | Koyama et al. ............ 48/94 |
| 6,979,507 | B2 | | 12/2005 | Edlund et al. |
| 2003/0223926 | A1 | | 12/2003 | Edlund et al. |

OTHER PUBLICATIONS

Sorensen, Bob et al., "Radiative Heat Transfer Via Fins in a Stream Reformer," U.S. Appl. No. 12/914,810, filed Oct. 28, 2010, 24 pages.

* cited by examiner

*Primary Examiner* — Walter Griffin
*Assistant Examiner* — Lessanework Seifu
(74) *Attorney, Agent, or Firm* — Alleman Hall McCoy Russell & Tuttle LLP

(57) ABSTRACT

Embodiments are disclosed that relate to increasing a temperature in a low temperature zone in a steam reforming reactor via a radiative heating shunt. For example, one disclosed embodiment provides a steam reforming reactor comprising a reaction chamber having an interior surface, a packing material located within the reaction chamber, and a radiative heating shunt extending from the interior surface into the reaction chamber. The radiative heating shunt comprises a porous partition enclosing a sub-volume of the reaction chamber bounded by the porous partition and a portion of the interior surface, the sub-volume being at least partly free of packing material such that radiative heat has a path from the interior surface to a distal portion of the porous partition that is unobstructed by packing material.

20 Claims, 7 Drawing Sheets

RADIATIVE HEAT TRANSFER VIA SHUNT IN A STEAM REFORMING REACTOR

TECHNICAL FIELD

The present disclosure relates to the field of reforming, and more particularly, to a methane steam reforming reactor for generating hydrogen for use in a fuel cell.

BACKGROUND

In a steam reforming reactor, under high temperatures (e.g., 400-800° C.) and in the presence of a catalyst (e.g., nickel), steam may react with a feed gas (e.g., methane) to generate a reformate (e.g., hydrogen) which may be used as fuel in a hydrogen fuel cell, for example. Because the reaction is endothermic, a heat source is needed to maintain a temperature range at which the reaction can occur. Further, as methane is converted, the partial pressure of methane decreases as the gases travel through the reactor. As such, a higher temperature is needed for the reaction to occur farther from an inlet of the reactor than for the reaction to occur closer to an inlet of the reactor.

Thus, a heater may be coupled to a portion of an outer wall of a reactor in order to heat the reactor to temperatures necessary for methane conversion along a length of the reactor. Due to low convective transport coefficients within the reactor, heat is transferred mainly via radiation. The reforming reaction immediately uses this energy in the vicinity of the outer wall, such that less energy is available to heat the inside of the reactor at locations farther from the outer wall. This may result in a low temperature zone spaced from the outer wall of the reactor. Since a higher temperature is needed for conversion in portions of the reactor closer to the outlet of the reactor due to the low partial pressure of methane in these portions of the reactor, the low temperature zone may result in elevated methane slip (e.g., un-reacted methane leaving the reactor), thereby decreasing the efficiency of the reactor.

SUMMARY

Accordingly, various embodiments are disclosed herein related to using a radiative heating shunt in a reactor in order to increase the temperature in a low temperature zone in a steam reforming reactor. For example, one disclosed embodiment provides a steam reforming reactor comprising a reaction chamber having an interior surface, a packing material located within the reaction chamber, and a radiative heating shunt extending from the interior surface into the reaction chamber. The radiative heating shunt comprises a porous partition enclosing a sub-volume of the reaction chamber bounded by the porous partition and a portion of the interior surface, the sub-volume being at least partly free of packing material such that radiative heat has a path from the interior surface to a distal portion of the porous partition that is unobstructed by packing material.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings, wherein.

DETAILED DESCRIPTION

The following description relates to various embodiments of a reactor which includes a radiative heating shunt configured to allow a desired intensity of radiative heat to reach farther into a reactor than a similar reactor without a shunt. Such a shunt may be used, for example, at a location in a reactor where a high temperature is used to drive a reaction toward completion. As described in more detail below, where radiative heat is provided to a reactor packing material via radiative heat transfer from a reactor wall, the packing material temperature may be cooler in regions spaced from the reactor wall due to the reduction in intensity of radiative heat as a distance from the wall increases. In such a reactor, the use of a shunt according to the embodiments disclosed herein may help to improve radiative heat transfer to locations in a reactor spaced from a radiative heat source relative to a reactor with no shunt. This may help to drive a reaction in the vicinity of the radiative heating shunt toward the formation of more products compared to the same region of the reactor in the absence of the shunt.

Figure 1:
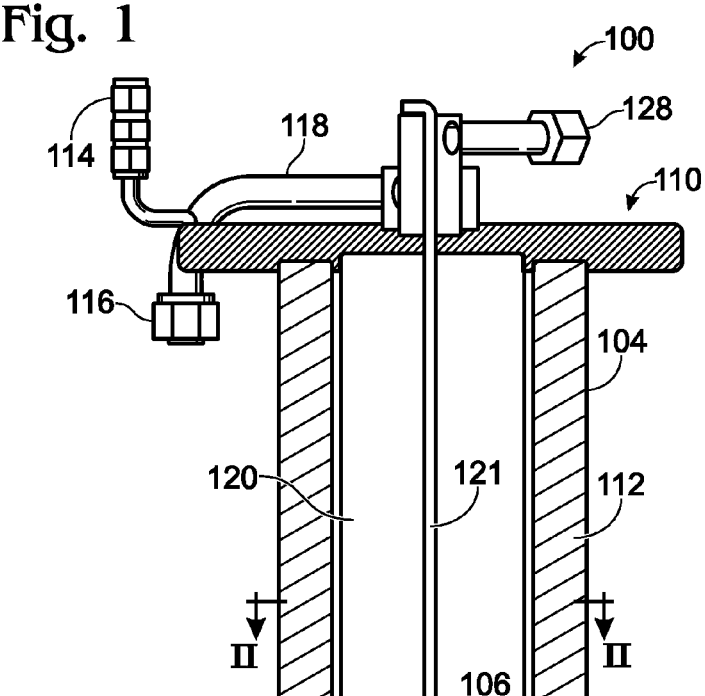
FIG. 1 schematically shows a cross-sectional view of a reactor with an internal radiation shunt in accordance with an embodiment of the present disclosure.

FIG. 1 schematically shows a cross-sectional view taken along an axial direction of an example embodiment of a reactor 100. Reactor 100 may be a steam reforming reactor, for example, which converts a mixture of steam and a feed gas such as methane to hydrogen and carbon monoxide and/or carbon dioxide.

In the example embodiment of FIG. 1, a mixture of feed gas (e.g., methane or other suitable reactant) and water enter reactor 100 via inlet 118. The mixture of feed gas and water may be produced in any suitable manner. In the depicted embodiment, feed gas from feed gas inlet 114 enters a water stream from water inlet 116 upstream of inlet 118. The feed gas may be an alcohol (e.g., methanol, ethanol, etc.) or a hydrocarbon (e.g., methane, propane, etc.). For the purpose of describing operation of the reactor, the examples described herein will assume the feed gas is methane. It should be understood, however, any suitable feed gas may be used. In some embodiments, the methane/water mixture may be converted to a gaseous mixture by a vaporizer (not shown) before entering reactor 100. In other embodiments, methane and water may be heated so that they are in gaseous form before they are mixed.

Figure 2:
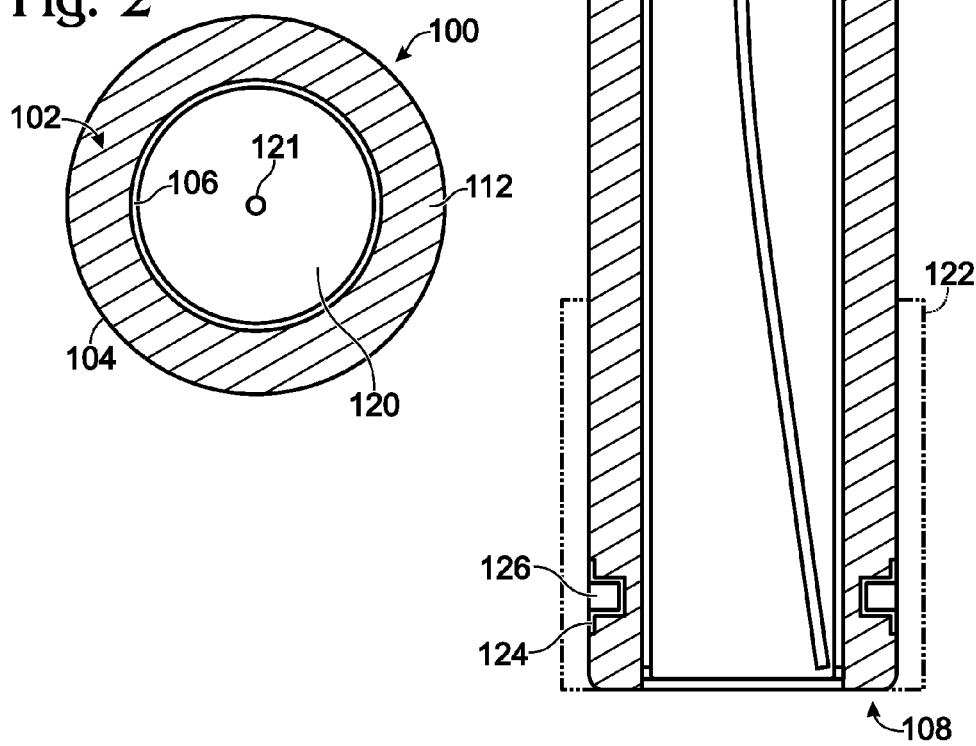
FIG. 2 schematically shows a cross-sectional view of the reactor of FIG. 1 taken along line II-II of FIG. 1.

From inlet 118, the feed gas/steam mixture enters reaction chamber 102. Reaction chamber 102 is defined by outer wall 104 and inner wall 106 of reactor 100. As shown in FIG. 2, which shows a cross-sectional view of reactor 100 taken along line II-II of FIG. 1, reaction chamber 102 has an annular shape due to the cylindrical shape of reactor 100. Other embodiments may have any other suitable shape, and may have any other suitable chamber configuration. For example, in some embodiments, the inner wall may be omitted, or the reaction chamber may comprise additional walls other than the illustrated internal and external walls.

Reaction chamber 102 is further defined by first axial end 108 of reactor 100 (e.g., the bottom of reactor 100) and opposing second axial end 110 of reactor 100 (e.g., the top of reactor 100). A second chamber 120 is located on an opposite side of inner wall 106 as reaction chamber 102, as shown in FIGS. 1 and 2. Second chamber 120 is in fluid communication with reaction chamber 102 at second axial end 110 of reactor 100, where the second chamber 120 receives a reformate stream from reaction chamber 102. Further, a thermocouple is illustrated at 121.

As shown in the example embodiment of FIGS. 1 and 2, reaction chamber 102 is filled with packing material 112. Packing material 112 may be a metal-based catalyst such as nickel which facilitates the reaction of feed gas and steam within reaction chamber 102. For example, in the presence of packing material 112 and at high temperature (e.g., 750° C.), methane reacts with steam to form hydrogen and carbon monoxide via the following reversible reaction:

$$CH_4 + H_2O \leftrightarrow CO + 3H_2. \tag{1}$$

Reactor 100 includes heater 122 for heating the reactor to a temperature for the reaction to occur. As shown in FIG. 1, heater 122 surrounds a portion of outer wall 104 extending from first axial end 108 partially toward second axial end 110. Heater 122 may cover 40% of the outer wall, for example. In some examples, 122 may be a burner such as a diffusion burner. Exhaust from burner 122 may be used to heat the feed gas/water mixture before it enters reaction chamber 102. In some embodiments, reactor 100 may further include a recuperator (not shown) which surrounds a portion of outer wall 104 extending from heater 122 toward second axial end 110. The recuperator may be used to heat or maintain a high temperature in the upper part of reaction chamber 102 using exhaust gas from heater 122 or exhaust gas from a fuel cell to which reactor 100 may supply fuel, for example. It will be understood that heat may be provided to reactor 100 in any other suitable manner, and that the above-described embodiment is not intended to be limiting in any manner.

Reformate generated in reaction chamber 102 exits reaction chamber 102 at first axial end 108 of reactor 100 and travels through second chamber 120 before exiting reformer 100 via reformate outlet 128.

In the embodiment of FIG. 1, heater 122 surrounds a portion of outer wall 104 from which a radiative heating shunt 124 extends. In the depicted embodiment, radiative heating shunt 124 comprises a porous partition that extends partially from an interior surface of outer wall 104 into reaction chamber 102 toward inner wall 106, thus enclosing sub-volume 126 of reaction chamber 102. Sub-volume 126 may be at least partly free of packing material 112, as shown in FIG. 1. As such, radiative heat from heater 122 has a path from the inside surface of outer wall 104 to a distal portion of the partition that is unobstructed by packing material 112. Packing material 112 is located between shunt 124 and inner wall 106. Thus, shunt 124 allows radiative heat from outer wall 104 to reach the packing material 112 between the shunt 124 and inner wall 106 at a higher intensity than in the absence of the shunt.

The radiative heating shunt may be located at any suitable position within the reactor interior. For example, in some embodiments, radiative heating shunt 124 may be located within 20% of first axial end 108 of reaction chamber 102 as a percentage of length of reaction chamber 102. In other embodiments, a radiative heating shunt may be provided at any other suitable location. Likewise, in the depicted embodiment, the heater surrounds the outer wall, and the radiative heating shunt extends from the interior surface of the outer wall. In other embodiments, energy may be provided to the reactor via an inner wall or other interior structure, and the radiative heating shunt accordingly may extend from an interior surface (e.g., a surface exposed to the interior of the reaction chamber) of such inner wall or other interior structure into the reaction chamber.

Due to the low pressure of gases in reactor 100, gases flow through the reactor with minimal radial mixing, such that gases that initially flow near inner wall 106 remain near inner wall 106 through the entire reaction chamber 102. The reversible equation shown above is endothermic in a left-to-right direction, and is thus driven from left to right by increasing temperature. Because packing material 112 may be hotter closer to outer wall 104 than to inner wall 106, in the absence of shunt 124, gases that flow near outer wall 104 may have a lower partial pressure of feed gas than gases that flow near inner wall 106. This may lead to feed gas slip (e.g., feed gas leaving the reaction chamber with the reformate).

On the other hand, by including radiative heating shunt 124, in the reduced presence of packing material in sub-volume 126 may allow radiative heat to travel to the distal portion of the porous partition. This may allow a greater amount of heat to be transferred to the low temperature zone near the inner wall of reactor 100 than in the absence of a shunt. This may help to drive the reaction more toward completion near the inner wall of reactor 100, and thereby may help to reduce feed gas slip.

Figure 3:
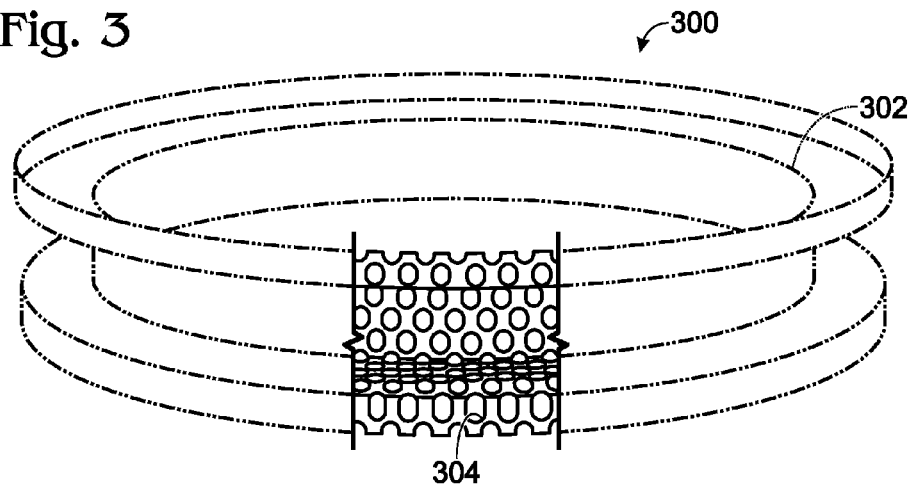
FIG. 3 schematically shows a radiative heating shunt in accordance with an embodiment of the present disclosure.

FIG. 3 schematically shows a radiative heating shunt 300 that may be used in a reactor, such as radiative heating shunt 124 described above with reference to FIG. 1. As shown, radiative heating shunt 300 has an annular shape such that it extends around the circumference of the inside surface of the outer wall of the reactor. Shunt 300 takes the form of a partition 302 formed from a material comprising a plurality of pores 304 which are configured to allow passage of gaseous reactants (e.g., methane and steam) and products (e.g., reformate) while excluding packing material from the sub-volume it encloses. For example, in some embodiments, pores 304 may have a smaller diameter than a smallest packing material unit diameter. In other embodiments, pores 304 may have any other suitable size. Shunt 300 may be formed from any suitable material or materials. Examples include, but are not limited to, stainless steel, nickel-chromium alloys such as those sold under the name Inconel by Specialty Metals Corporation of New Hartford, N.Y., ceramics, etc.

FIGS. 4-13 show graphs illustrating results of computer modeling that illustrate example reactor conditions in an embodiment of a reactor having the configuration of reactor 100 both with and without a radiative heating shunt, such as radiative heating shunt 300 shown in FIG. 3. A two-dimensional model which combines reformate and catalyst properties was used to generate the results displayed in FIGS. 4-13. The model uses the following partial differential equations to simulate the reformer:

$$\frac{\partial x_i}{\partial z} - \frac{D_e}{u}\left(\frac{\partial^2 x_i}{\partial r^2} + \frac{1}{r}\frac{\partial x_i}{\partial r}\right) - \frac{\rho_c r_{c,i}}{u_0 c_{0,i}} = 0 \text{ and} \quad (2)$$

$$\frac{\partial T}{\partial z} - \frac{k_e}{Gc_p}\left(\frac{\partial^2 T}{\partial r^2} + \frac{1}{r}\frac{\partial T}{\partial r}\right) + \frac{\Delta H \rho_c r_c}{Gc_p} = 0, \quad (3)$$

where equation (2) is a mass balance equation and equation (3) is an energy balance equation. Based on the stoichiometry of the reformate stream, two molecular species are used to describe the reaction in the reformer, $CH_4$ and $CO_2$. Further, a model (Xu and Froment, 1989) for the reformer kinetics is used for the energy equation (3). As such, the analysis involves the simultaneous solution of three (e.g., $CH_4$ composition, $CO_2$ composition, and temperature) coupled nonlinear partial differential equations involving radiation, convection, conduction, rapidly changing chemical reaction, and rapidly changing physical properties. A third order five point finite difference stencil was used to solve the equations. The solution includes "internals" and "externals." The internals are indicated in equations (2) and (3) as geometry, velocity, density, heat capacity, and other thermo-physical properties; further, dynamic models of each of these properties were employed, and the externals are the boundary conditions. Two of the above parameters, $D_e$, the effective convective diffusivity and $k_e$, the effective thermal diffusivity, use combined parameters (e.g., reformate and catalyst properties) for simplification.

Figure 4:
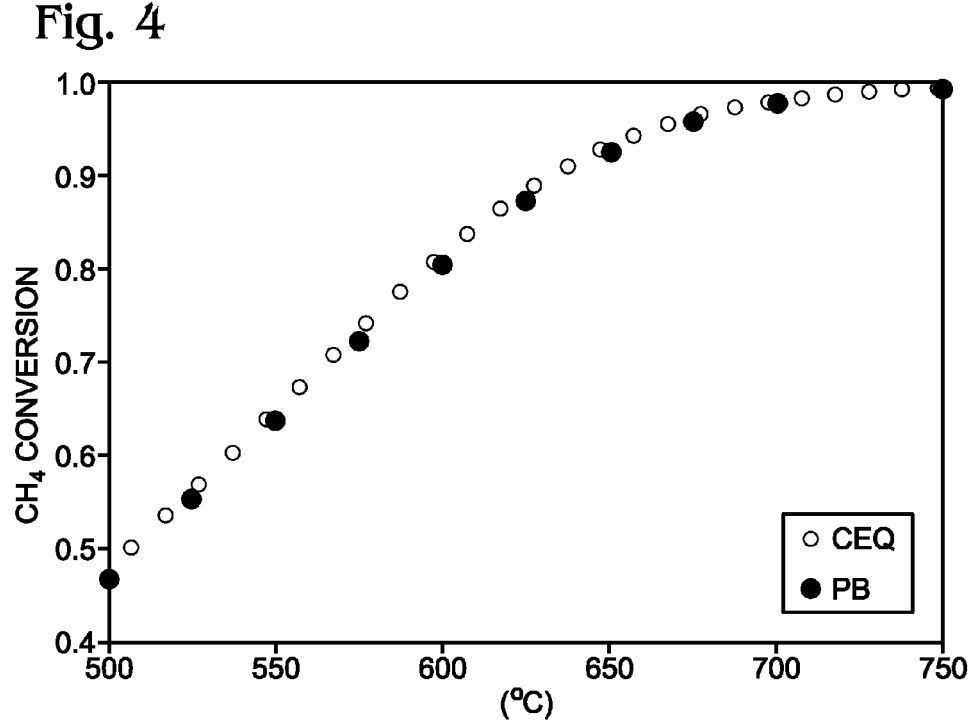
FIG. 4 shows a graph illustrating a modeling of methane conversion as a function of temperature in a reactor in accordance with an embodiment of the present disclosure.

The graph in FIG. 4 shows an example of methane conversion as a function of temperature of the reactor. The black dots in FIG. 4 represent data obtained from a packed bed model using the kinetic reaction model described above. The open circles in FIG. 4 represent data obtained from an equilibrium conversion model. As shown, the data from each model has a similar trend in which methane conversion increases with increasing temperature. Further, the similar trend demonstrated by the two models may indicate the packed bed model is an accurate model for a reactor, such as reactor 100 described above.

Figure 5:
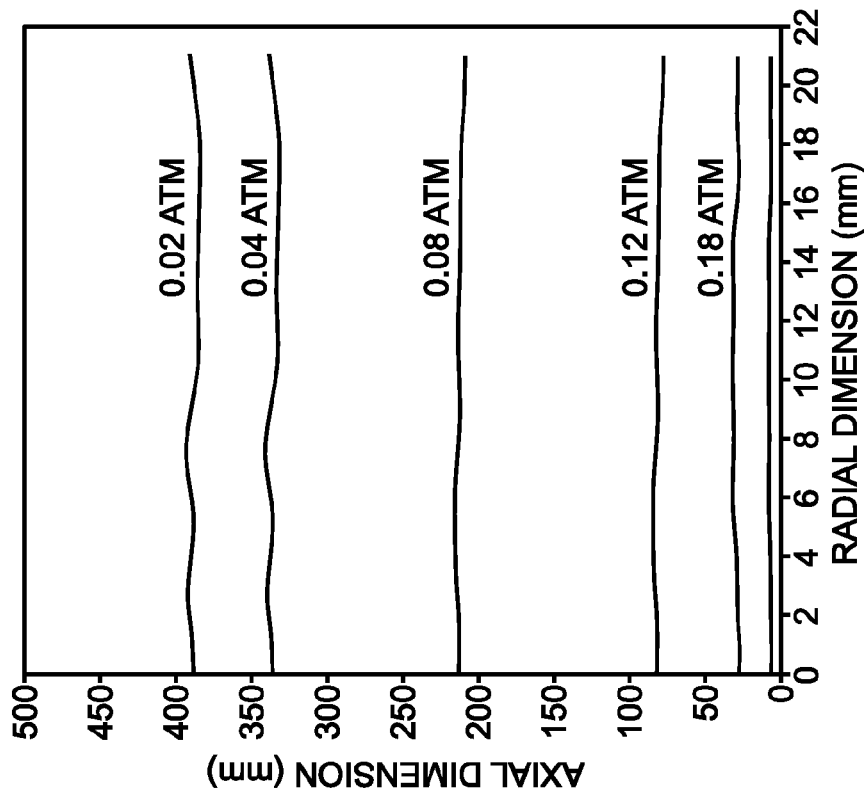
FIG. 5 shows a graph illustrating an example of a modeling of a methane partial pressure profile in a reactor in accordance with an embodiment of the present disclosure.

FIG. 5 shows a graph illustrating a modeling of a partial pressure profile of methane throughout a reaction chamber in a reactor. It should be noted, the bottom of the graph in FIG. 5 corresponds to the top of the reactor where feed gas and steam enter the reactor and reformate generation begins and the top of the graph corresponds to the bottom of the reactor where reformate generation ceases. It will be understood that the modeling also may apply to feed gases other than methane. As shown, the partial pressure of methane decreases with depth in the reaction chamber (from an axial dimension of 0 mm to an axial dimension of 500 mm). As the partial pressure of methane decreases, reaction kinetics (e.g., rate of reaction) slow down. Accordingly, a higher temperature is needed near the first axial end of the reaction chamber in order to increase methane conversion in that region of the reaction chamber. Further, high temperature gradients near the first axial end of the reaction chamber facilitate the transport of energy across the reaction chamber from the outer wall, where the heater is located, to the inner wall.

Figure 6:
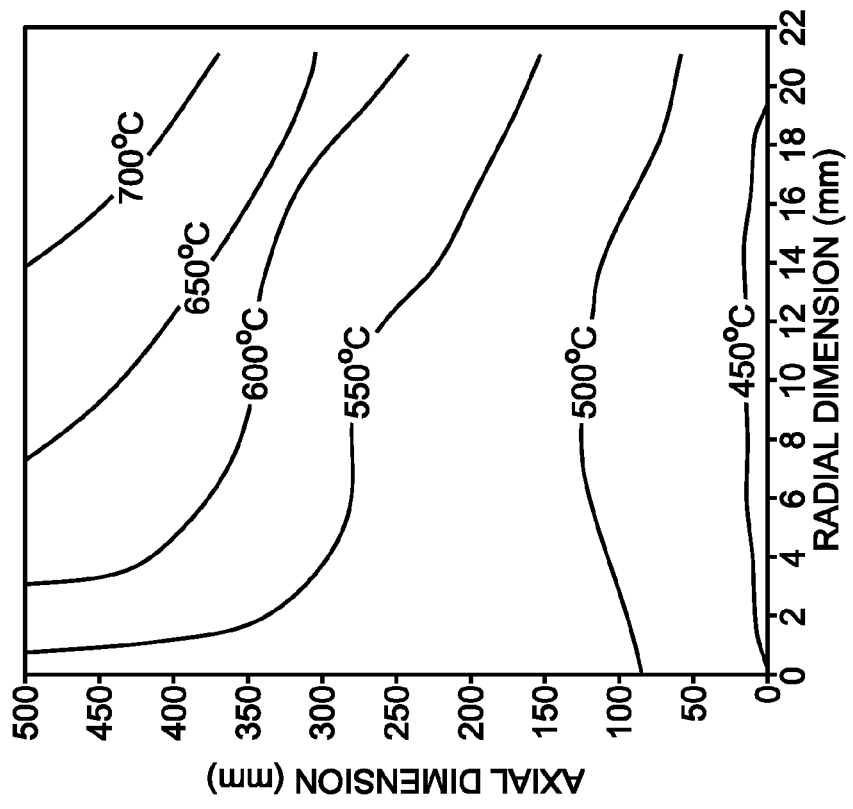
FIG. 6 shows a thermal plot illustrating a modeling of an example temperature profile of a reactor without a radiative heating shunt.
Figure 9:
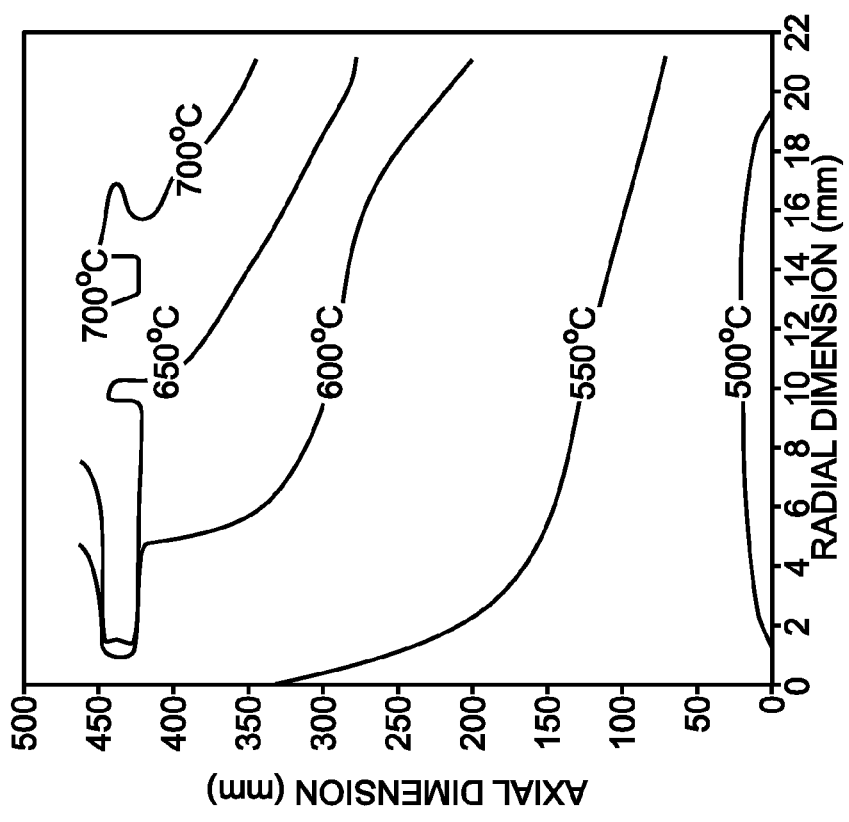
Figure 10:
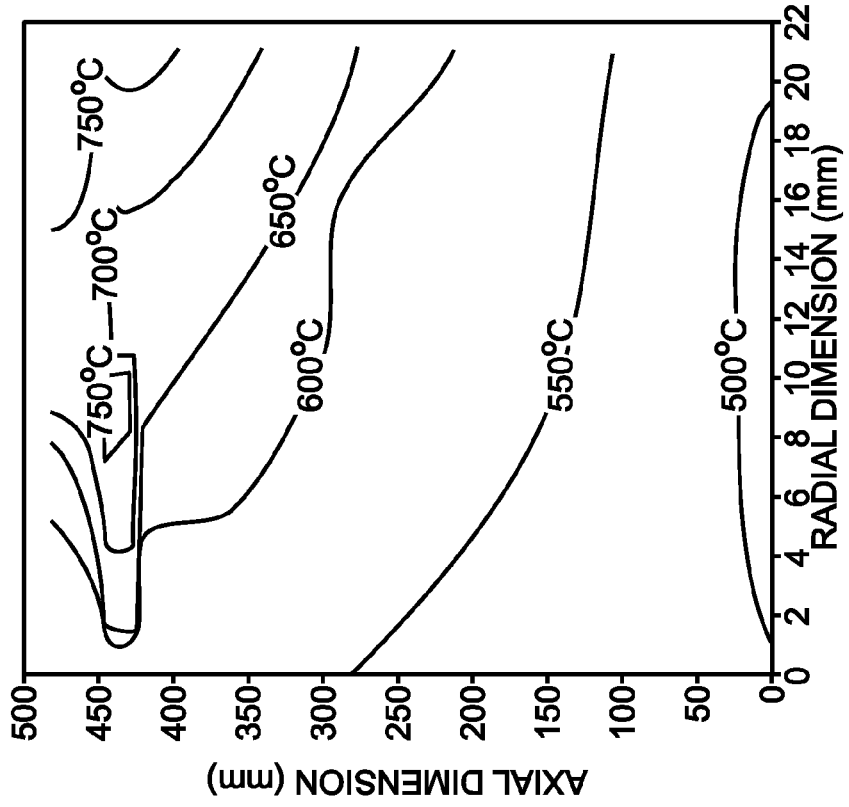
Figure 11:
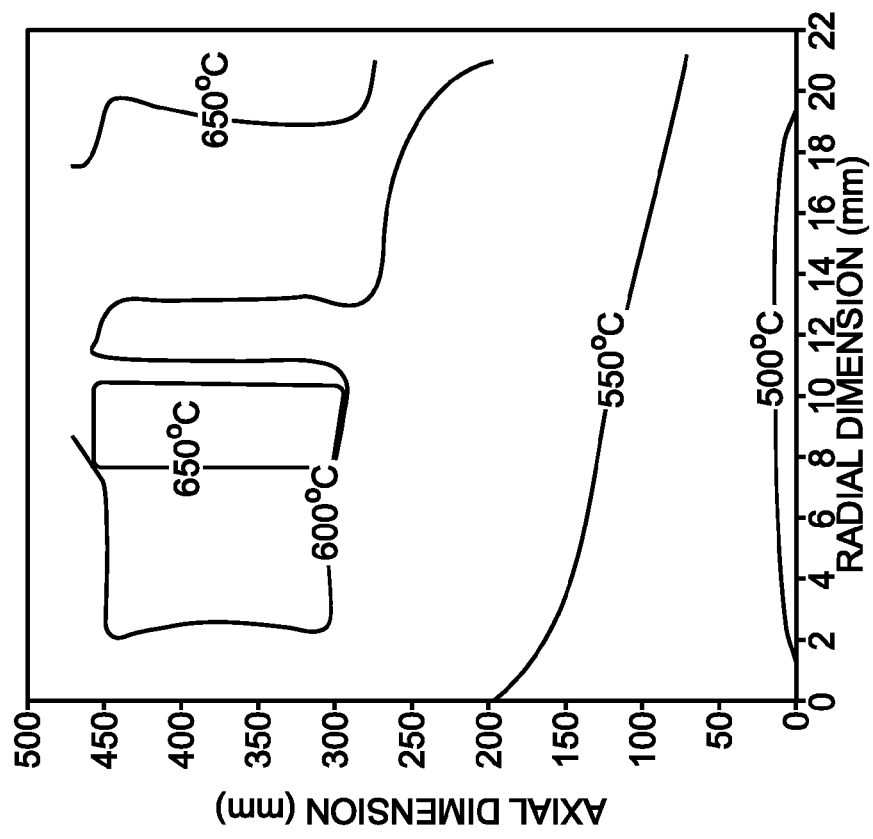
FIGS. 11-13 show thermal plots each illustrating a modeling of example temperature profiles for various embodiments of a reactor with two radiative heating shunts.
Figure 12:
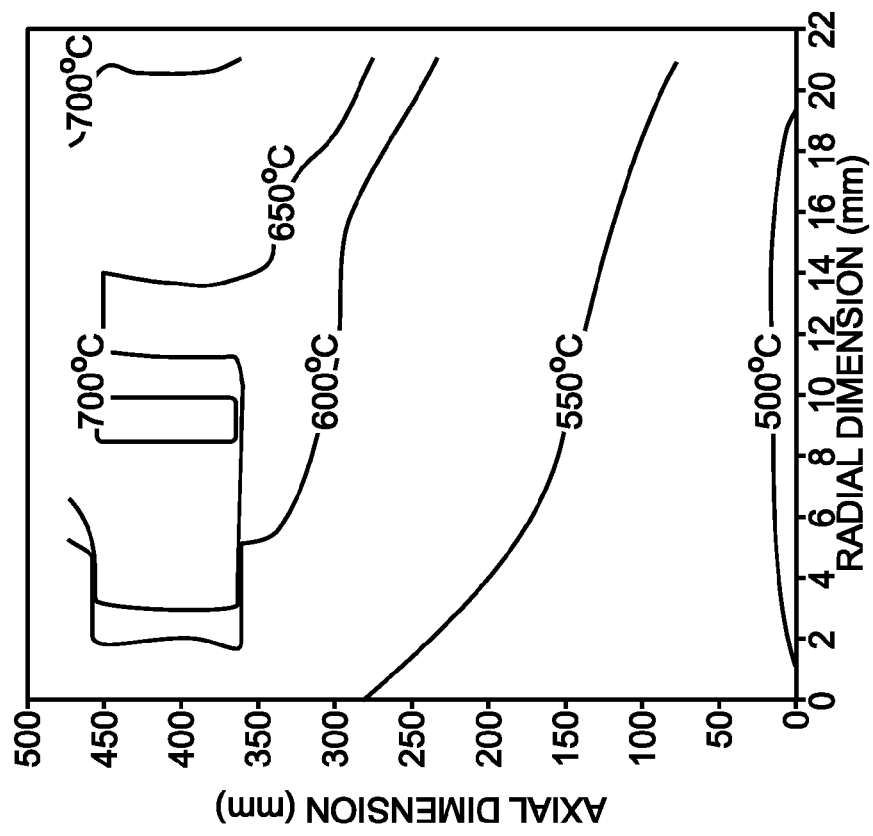
Figure 13:
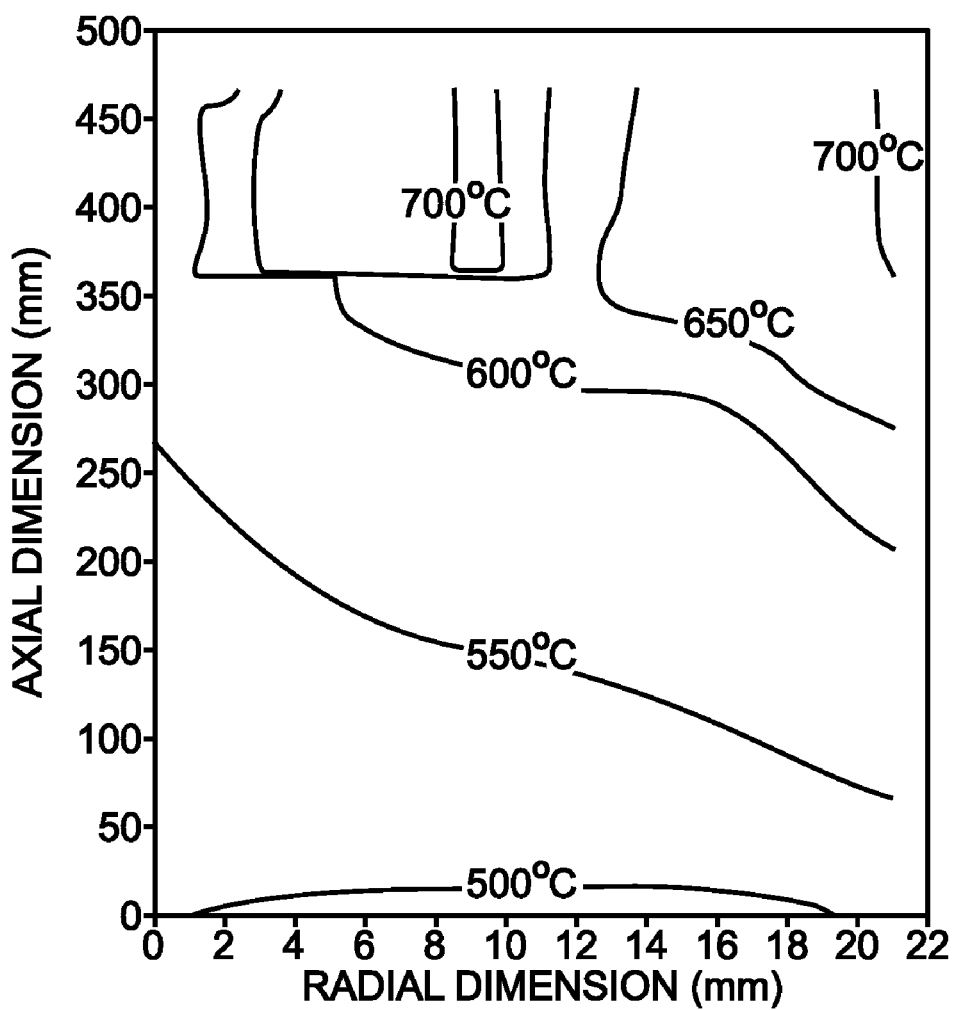

The graphs in FIGS. 6-13 show example temperature profiles in a reaction chamber of a reactor which includes zero, one (as depicted in FIG. 1), or two radiative heating shunts. The data in FIGS. 6-13 was generated using the model described above. In the example of FIG. 6, the reactor does not have a radiative heating shunt. In the examples of FIGS. 7-10, the reactor has one heating shunt. In the examples of FIGS. 11-13, the reactor has two heating shunts. The x-axis in FIGS. 6-13 corresponds to a radial dimension (in millimeters) of the reaction chamber, where 0 mm is the inner wall of the reactor and 21 mm is the outer wall of the reactor. The y-axis in FIGS. 6-13 corresponds to an axial dimension (in millimeters) of the reaction chamber, where 0 mm is the second axial end of the reactor and 500 mm is the first axial end of the reactor. It should be noted, in the examples of FIGS. 6-13, the bottom of the graph corresponds to the top of the reactor where feed gas and steam enter the reactor and reformate generation begins and the top of the graph corresponds to the bottom of the reactor where reformate generation ceases. It should be further noted, in the examples of FIGS. 6-13, the model assumes a heater supplies energy to the outer wall of the reactor between 300 and 500 mm of the axial dimension.

The graph in FIG. 6 illustrates an example of temperature within the reaction chamber of a reactor in a case in which a radiative heating shunt is not disposed in the reactor. As shown in FIG. 6, the temperature inside the reaction chamber increases with depth along the axial direction, with the lowest temperature (~450° C.) at 0 mm and the highest temperature (~700° C.) at 500 mm. Further, temperature increases in the radial direction, with the lowest temperature (~450° C.) at 0 mm and the highest temperature (~700° C.) at 21 mm. In the example of FIG. 6, the temperature profile within the reaction chamber is not symmetric. The highest temperatures occur in the vicinity of the outer wall where the heater is located and the temperature decreases with distance from the heater in both the axial and radial directions.

As shown in FIG. 6, along the axial region where the heater is located (300 to 500 mm), there is a temperature difference of at least ~100° C. between the inner wall and the outer wall of the reaction chamber. Further, a temperature zone in which an acceptable conversion of methane can occur (e.g., the reaction rate is high enough) extends ~75% across the reaction chamber (from a radial dimension of 21 mm to a radial dimension of ~5 mm). As such, there is a (relatively) "cold zone" near the inner wall of the reaction chamber. In the cold zone, the reaction rate may not be high enough, leading to feed gas slip. Thus, a radiative heating shunt may be used in the reactor in order to extend the high temperature zone in which acceptable methane conversion occurs across the reaction chamber to the inner wall.

FIGS. 7-13 illustrate example temperature profiles of a reaction chamber in which one or two heating shunts are used to reduce the cold zone.

Figure 7:
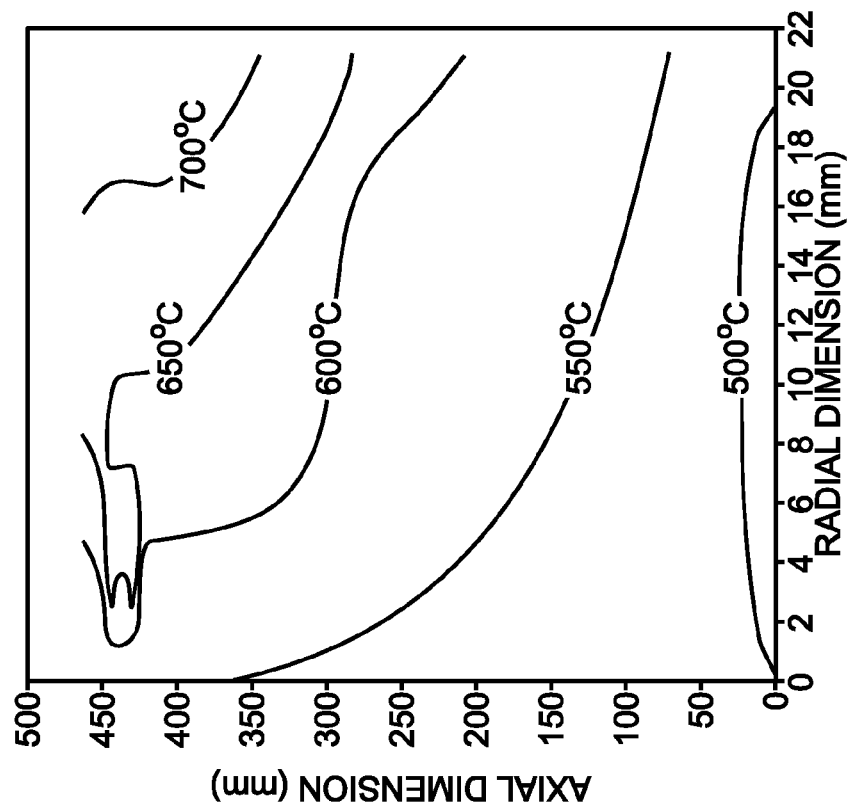
FIGS. 7-10 show thermal plots each illustrating a modeling of example temperature profiles for various embodiments of a reactor with a radiative heating shunt.

First, FIG. 7 shows an example in which the reactor is modeled as having one radiative heating shunt positioned between the axial dimensions of 460 and 480 mm (e.g., the shunt has a height of 20 mm). In this example, the shunt contacts the outer wall of the reactor and extends across one half of the annular cross-sectional area of the reaction chamber. As shown, the temperatures close to the inner wall near the axial dimensions where the shunt is located are greater than those in the example of FIG. 6 in which the reactor does not have a heating shunt. Thus, the radiative heating shunt mitigates the cold temperature zone near the inner wall of the reactor. Further, the temperature is increased throughout the reaction chamber. For example, at an axial dimension of 100 mm, the reaction chamber has a temperature of ~550° C. instead of ~500° C. as in the example where no shunt is used. This may help to reduce methane slip.

Figure 8:
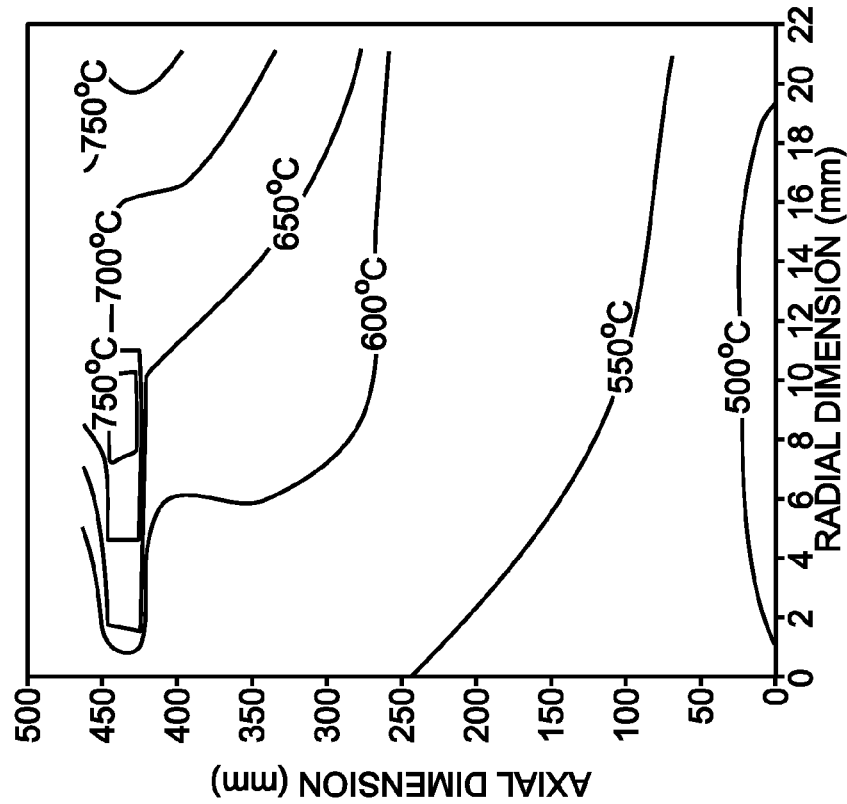

In the example of FIG. 8, the reactor is modeled as having one radiative heating shunt positioned between the axial dimensions of 460 and 480 mm. The shunt in this example contacts the outer wall of the reactor and extends across two thirds of the annular cross-sectional area of the reaction chamber. As such, radiation can reach deeper into the reaction chamber from the outer wall and transport energy closer to the inner wall of the reactor. As shown, temperature in the vicinity of the shunt increases compared to the example illustrated in FIG. 6 where no shunt is used, but it does not increase as much as in the example of FIG. 7.

FIG. 9 illustrates an example in which the reactor is modeled as having one radiative heating shunt positioned between the axial dimensions of 460 and 480 mm. As with the shunt in the example of FIG. 7, the shunt in this example contacts the outer wall of the reactor and extends across one half of the annular cross-sectional area of the reaction chamber. Furthermore, in this example, the length of the reaction chamber is extended to 520 mm. As such, there is 40 mm of catalyst below the shunt instead of 20 mm, as in the above examples. In this example, the temperature in the vicinity of the shunt increases leading to an increased temperature near the inner wall (compared to the example of FIG. 6 where no shunt is used), however, the overall temperature increase throughout the reaction chamber is not as great as in the example illustrated in FIG. 7.

In the example of FIG. 10, the reactor is modeled as having one radiative heating shunt positioned between the axial dimensions of 460 and 480 mm. In this example, the shunt contacts the outer wall of the reactor and extends across one third of the annular cross-sectional area of the reaction chamber. As shown, the temperature increases in the vicinity of the shunt as well as throughout the reaction chamber (compared to the example where no shunt is used). There is a greater temperature increase throughout the reaction chamber than in the example of FIG. 8, however, the increase is not as great as the temperature increase in the example of FIG. 7. Further, the temperature profile is improved over a reactor without a shunt (e.g., as illustrated in FIG. 6).

FIG. 11 shows an example in which the reactor is modeled as having two radiative heating shunts, a first shunt positioned between the axial dimensions of 390 and 410 mm and a second shunt positioned between the axial dimensions of 460 and 480 mm. Both shunts contact the outer wall of the reactor and extend across one half of the annular cross-sectional area of the reaction chamber. As shown in FIG. 11, the overall temperature increase in the reaction chamber is not as great as in the example shown in FIG. 7; however, the temperature profile is improved over the example of FIG. 6 in which no shunt is used.

In the example of FIG. 12, the reactor is modeled as having two radiative heating shunts, a first shunt positioned between the axial dimensions of 320 and 340 mm and a second shunt positioned between 460 and 480 mm. As the shunts in the example of FIG. 11, both shunts in this example contact the outer wall of the reactor and extend across one half of the annular cross-sectional area of the reaction chamber. In this example, the temperature is increased in the vicinity of the shunt (compared to the example where no shunt is used), however, the temperature in the hottest area of the reaction chamber decreases in this example in contrast to all of the other examples (zero, one, or two shunts).

FIG. 13 shows an example in which the reactor is modeled as having two radiative heating shunts, a first shunt positioned between the axial dimension of 390 to 410 mm and a second shunt positioned between 460 to 500 mm. Thus, in this example, the first shunt has a height of 20 mm and the second shunt has a height of 40 mm. As with the shunts in the examples of FIGS. 11 and 12, both shunts in this example contact the outer wall of the reactor and extend across one half of the annular cross-sectional area of the reaction chamber. As shown in FIG. 13, temperature increases throughout the catalyst compared to the example of FIG. 6 in which no shunt is used, however, the overall increase is not as great as that in the example of FIG. 7.

Thus, various configurations of one or more radiative heating shunts may be used in a reactor in order to reduce a cold zone that exists near the inner wall of the reaction chamber. This may help to reduce feed gas slip, and thereby increase the efficiency of the reactor relative to a similar reactor lacking such a shunt.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A steam reforming reactor, comprising:
    a reaction chamber comprising an interior surface;
    a packing material located within the reaction chamber; and
    a radiative heating shunt extending from the interior surface into the reaction chamber, the radiative heating shunt comprising a porous partition enclosing a sub-volume of the reaction chamber bounded by the porous partition and a portion of the interior surface, the sub-volume being at least partly free of packing material such that radiative energy has a path from the interior surface wall to a distal portion of the porous partition that is unobstructed by packing material.

2. The steam reforming reactor of claim 1, wherein the interior surface comprises an interior surface of a wall of the reactor, wherein the wall is an outer wall, and further comprising an inner wall, wherein the reaction chamber is located between the outer wall and the inner wall.

3. The steam reforming reactor of claim 2, wherein the radiative heating shunt extends partially from the outer wall toward the inner wall, and wherein packing material is located between the radiative heating shunt and the inner wall.

4. The steam reforming reactor of claim 1, wherein the reaction chamber comprises a first axial end and an opposing second axial end, and wherein the radiative heating shunt is located within 20% of the first axial end of the reaction chamber as a percentage of a length of the reaction chamber.

5. The steam reforming reactor of claim 4, further comprising a feed gas inlet disposed closer to the second axial end than the first axial end.

6. The steam reforming reactor of claim 1, wherein the radiative heating shunt comprises a plurality of pores configured to allow passage of gaseous reactants and products while excluding packing material from the sub-volume.

7. The steam reforming reactor of claim 1, wherein the reactor has a cylindrical shape, and wherein the radiative heating shunt has an annular shape.

8. A steam reformer system, comprising:
a reactor, comprising
 an outer wall defining a reaction chamber, the outer wall having a first axial end and a second axial end,
 a packing material located within the reaction chamber, and
 a radiative heating shunt extending from an inside surface of the outer wall into the reaction chamber, the radiative heating shunt comprising a porous partition enclosing a sub-volume of the reaction chamber bounded by the porous partition and a portion of the inside surface of the wall, the sub-volume being at least partly free of packing material such that radiative heat has a path from the inside surface of the wall to a distal portion of the porous partition that is unobstructed by packing material;
a heater surrounding a portion of the outer wall extending from the first axial end partially toward the second axial end; and
a feed gas inlet disposed closer to the second axial end of the outer wall than the first axial end.

9. The steam reforming reactor system of claim 8, further comprising an inner wall, wherein the reaction chamber is located between the outer wall and the inner wall.

10. The steam reforming reactor system of claim 9, wherein the radiative heating shunt extends partially from the outer wall toward the inner wall, and wherein packing material is located between the radiative heating shunt and the inner wall.

11. The steam reforming reactor system of claim 8, wherein the radiative heating shunt is located within 20% of the first axial end of the reaction chamber as a percentage of a length of the reaction chamber.

12. The steam reforming reactor system of claim 11, wherein the heater surrounds the portion of the outer wall from which the radiative heating shunt extends.

13. The steam reforming reactor system of claim 8, wherein the radiative heating shunt comprises a plurality of pores configured to allow passage of gaseous reactants and products while excluding packing material from the sub-volume.

14. The steam reforming reactor system of claim 8, wherein the reactor has a cylindrical shape, and wherein the radiative heating shunt has an annular shape that extends around the inside surface of the outer wall.

15. A steam reforming reactor, comprising
an outer wall;
an inner wall;
a reaction chamber disposed between the outer wall and the inner wall;
a second chamber located on an opposite side of the inner wall as the reaction chamber, wherein the second chamber is in fluid communication with the reaction chamber;
a packing material disposed in the reaction chamber; and
a porous partition extending partially between the outer wall and the inner wall around a circumference of the reaction chamber thereby defining a sub-volume, wherein the partition comprises a plurality of pores having a smaller diameter than a smallest packing material unit diameter.

16. The steam reforming reactor of claim 15, wherein the sub-volume is substantially free of packing material.

17. The steam reforming reactor of claim 16, wherein the porous partition extends partially from the outer wall toward the inner wall, and wherein packing material is located between the porous partition and the inner wall.

18. The steam reforming reactor of claim 15, wherein the reaction chamber comprises a first axial end and an opposing second axial end, and wherein the porous partition is located within 20% of the first axial end of the reaction chamber as a percentage of a length of the reaction chamber.

19. The steam reforming reactor of claim 18, further comprising a feed gas inlet disposed closer to the second axial end than the first axial end.

20. The steam reforming reactor of claim 15, wherein the reactor has a cylindrical shape, and wherein the porous partition has an annular shape.

* * * * *